(12) United States Patent
Levi

(10) Patent No.: US 11,612,140 B2
(45) Date of Patent: Mar. 28, 2023

(54) CHEW RESISTANT, REFLECTIVE ADJUSTABLE DOG COLLAR

(71) Applicant: Vendition 360 LLC, Mooresville, NC (US)

(72) Inventor: Robert Levi, Mooresville, NC (US)

(73) Assignee: Vendition 360 LLC, Mooresville, NC (US)

( * ) Notice: Subject to any disclaimer, the term of this patent is extended or adjusted under 35 U.S.C. 154(b) by 47 days.

(21) Appl. No.: 17/206,830

(22) Filed: Mar. 19, 2021

(65) Prior Publication Data

US 2021/0289750 A1 Sep. 23, 2021

Related U.S. Application Data

(60) Provisional application No. 62/992,446, filed on Mar. 20, 2020.

(51) Int. Cl.
*A01K 27/00* (2006.01)

(52) U.S. Cl.
CPC .................................. *A01K 27/001* (2013.01)

(58) Field of Classification Search
CPC ....................................................... A01K 27/001
See application file for complete search history.

(56) References Cited

U.S. PATENT DOCUMENTS

| | | | | |
|---|---|---|---|---|
| 6,044,802 A * | 4/2000 | Schmid | ................ | A01K 13/006 119/856 |
| 8,613,262 B1 * | 12/2013 | Mergard | .............. | A01K 27/001 119/858 |
| 2007/0028856 A1 * | 2/2007 | Ma | ........................ | A01K 27/002 119/831 |
| 2011/0180015 A1 * | 7/2011 | Larson | ................. | A01K 27/001 119/863 |
| 2014/0096724 A1 * | 4/2014 | Kantor | ................. | A01K 27/001 119/857 |
| 2014/0299072 A1 * | 10/2014 | James | .................. | A01K 27/006 119/856 |
| 2015/0173328 A1 * | 6/2015 | Pincus | ................. | A01K 27/001 29/433 |
| 2016/0324125 A1 * | 11/2016 | Jasmine, Sr. | ........ | A01K 27/003 |
| 2017/0360025 A1 * | 12/2017 | Skryplonek | ........... | A01M 29/30 |
| 2020/0107522 A1 * | 4/2020 | Kersey | ............... | G08B 21/0261 |

FOREIGN PATENT DOCUMENTS

| | | | | |
|---|---|---|---|---|
| GB | 2509512 A | * | 7/2014 | ........... A01K 27/006 |
| WO | WO-9955146 A1 | * | 11/1999 | .............. A01K 27/00 |
| WO | WO-2007063354 A1 | * | 6/2007 | ........... A01K 27/005 |

* cited by examiner

*Primary Examiner* — Magdalena Topolski
*Assistant Examiner* — Katherine Anne Kloecker
(74) *Attorney, Agent, or Firm* — Shumaker, Loop & Kendrick, LLP

(57) ABSTRACT

A chew resistant, adjustable animal collar having a semi-rigid but flexible insert affixed therein to increase durability thereof. The chew resistant, adjustable animal collar including a first metal wire affixed to a first peripheral edge of and spanning substantially an entire length of a longitudinal axis of the insert. The chew resistant, adjustable animal collar further including a second metal wire affixed to a second peripheral edge of the insert on an opposing side thereof relative to the first peripheral edge of the insert with the second metal wire also spanning substantially the entire length of the longitudinal axis of the insert.

11 Claims, 5 Drawing Sheets

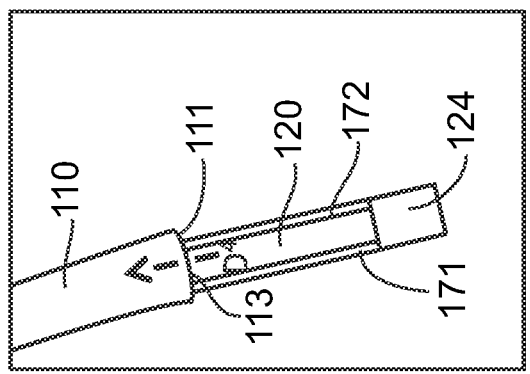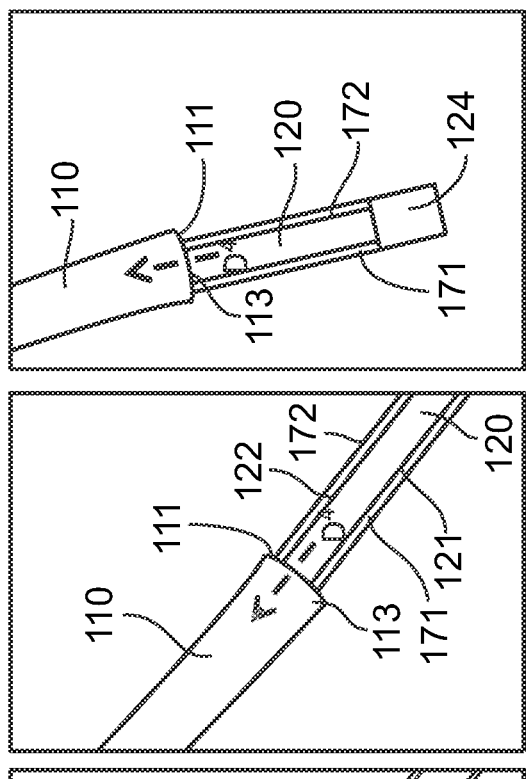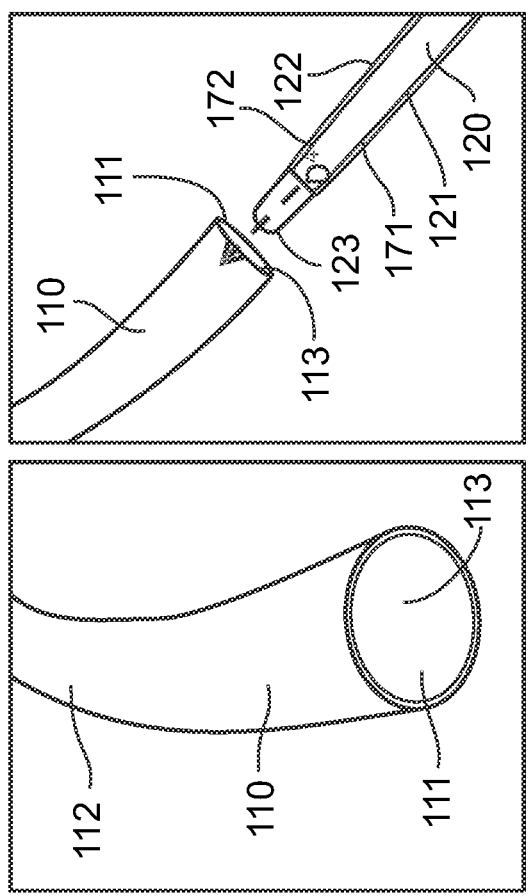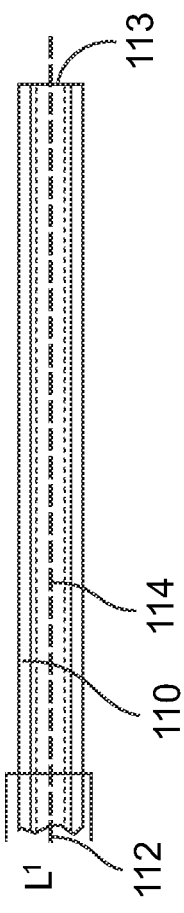

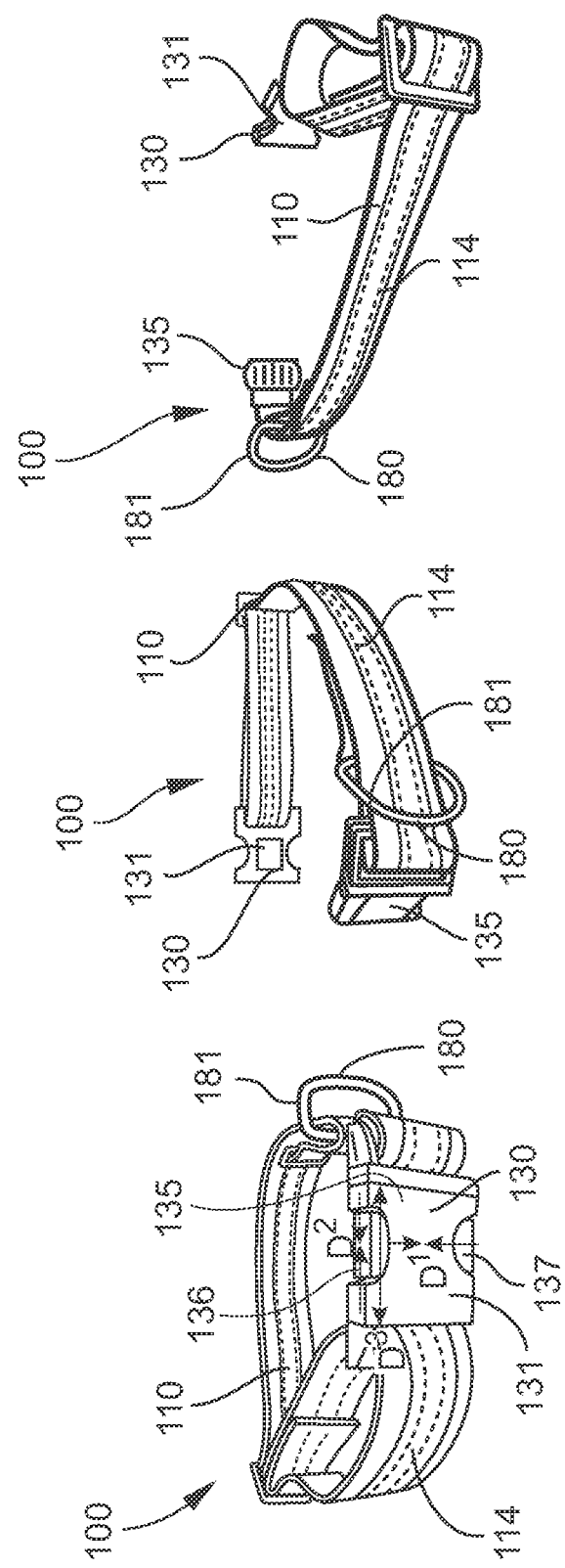

CHEW RESISTANT, REFLECTIVE ADJUSTABLE DOG COLLAR

TECHNICAL FIELD

The present invention relates generally to the field of animal collars, and more particularly, to chew resistant, reflective adjustable dog collars.

BACKGROUND

Animal collars, and more particularly dog collars, as well as leashes are often required in parks and housing developments while walking ones animal. This serves as a preventive measure to minimize animals from randomly wandering about within the parks and/or housing developments and is further viewed as a general safety measure.

Numerous different types of animal collars currently exist such as buckle collars, break-away collars, flat collars, aversive collars, and safety stretch collars, and over the past several decades, quick-release buckle collars have particularly gained popularity due to their utility as well as ease of use. However, many dogs do not prefer wearing collars often resulting in dogs chewing the collars, which further results in loss of overall structural integrity of the collar and the need for constant replacement thereof. Also, when multiple dogs are together playing or in a cage, they tend to chew on each other's collars as well. In addition, larger dog breeds often apply constant stress and force on these collars while being walked on a leash often resulting in warped, ill-fitting collars that also need to be constantly replaced. Thus, there is a need for an improved animal collar, and more particularly for a chew resistant animal collar.

SUMMARY

Disclosed herein are chew resistant, adjustable animal collars that overcome the various problems observed with conventional collars. For example, the collars disclosed herein are particularly chew resistant and/or warp resistant, thus resulting in a more durable and longer lived collar. In particular disclosed is a chew resistant, adjustable animal collar including: (a) a tubular, elongate fabric sheath having two opposing ends that are fluidly connected to one another by an internal cavity extending through the tubular, elongate fabric sheath; (b) a chew, resistant semi-rigid but flexible elongate insert affixed to and completely positioned internally within the tubular, elongate fabric sheath; (c) a first portion of a fastening means affixed to a first end of the two opposing ends of the tubular, elongate fabric sheath; and (d) a second portion of the fastening means affixed to a second end tubular, elongate fabric sheath in which the first and second portions of the fastening means are configured to securely engage one another while the chew resistant, adjustable animal collar is in use.

In certain aspects, the chew resistant, adjustable animal collar includes a reflective material affixed to an outer surface of the tubular, elongate fabric sheath and spanning substantially an entire length along a longitudinal axis of the tubular, elongate fabric sheath.

In certain aspects, the chew, resistant semi-rigid but flexible elongate insert has two opposing ends in which each opposing end is tapered in width to facilitate insertion within the tubular, elongate fabric sheath.

In certain aspects, the chew, resistant semi-rigid but flexible elongate insert comprises a vinyl laminate material.

In certain aspects, the vinyl laminate material ranges from 0.07 inches to 0.1 inches in thickness.

In certain aspects, the chew resistant, adjustable animal collar further includes a first metal wire affixed to a first peripheral edge of and spanning substantially an entire length of a longitudinal axis of the vinyl laminate material.

In certain aspects, the chew resistant, adjustable animal collar further includes a second metal wire affixed to a second peripheral edge of the vinyl laminate material on an opposing side of the vinyl laminate material relative to the first peripheral edge of the vinyl laminate material, second metal wire spanning substantially the entire length of the longitudinal axis of the vinyl laminate material.

In certain aspects, each metal wire comprises a galvanized vinyl coated steel wire.

In certain aspects, the galvanized vinyl coated steel wire has a diameter ranging from $1/8$ inch to $1/18$ inch.

In certain aspects, the galvanized vinyl coated steel wire has a diameter of $1/16$ inch.

In certain aspects, the fastening means comprises a side release buckle.

In certain aspects, the side release buckle includes: (i) a body (or housing) as the first portion of the fastening means; and (ii) resiliently deformable locking pins as the second portion of the fastening means that are securely received within the body (housing) when the body and resiliently deformable locking pins are advanced towards one another and the resiliently deformable locking pins are received within the body to securely engage the locking pins within the body to achieve a locked conformation, the resiliently deformable locking pins are also configured to be released from the body when the locking pins are biased towards one another and the body and resiliently deformable locking pins are moved in opposite directions away from one another. In certain aspects, the side release buckle is configured to adjust overall length of the chew resistant, adjustable animal collar.

In certain aspects, the chew resistant, adjustable animal collar further includes a loop affixed along a length of the chew resistant, adjustable animal collar and internal relative to the fastening means, the loop configured for leash attachment thereto.

In certain aspects, the loop is a D ring.

In certain aspects, the chew resistant, adjustable animal collar is a dog collar.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which:

FIGS. 3A, 3B, 3C, 3D, and 3E of the chew, resistant semi-rigid but flexible elongate insert being inserted within the cavity of the tubular, elongate fabric sheath; and FIG. 4A depicts a front view of the chew resistant, adjustable animal collar in a buckled conformation; FIG. 4B depicts a side view of the chew resistant, adjustable animal collar in an unbuckled conformation; and FIG. 4C depicts a back view of the chew resistant, adjustable animal collar in an unbuckled conformation.

DETAILED DESCRIPTION

Figure 1C:
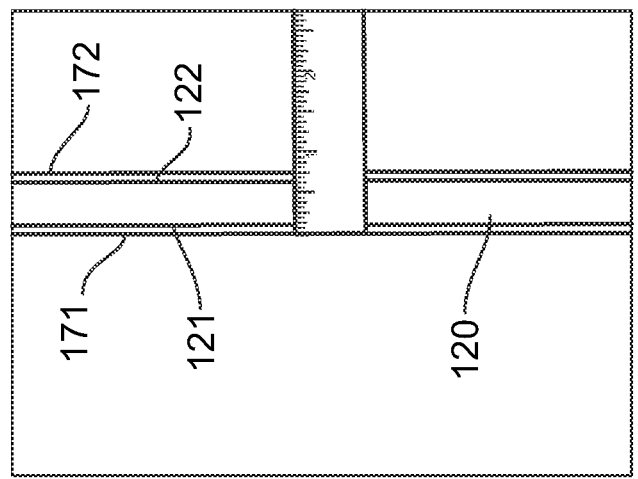
FIG. 1C shows a first and second metal wire affixed to opposing peripheral edges of the chew, resistant semi-rigid but flexible elongate insert.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings. It should be noted that "chew resistant" as used herein means substantially chew proof such that an animal (dog) cannot chew through the collar.

FIGS. 1A-5 depict the fully assembled chew resistant, adjustable animal collar (100) disclosed herein and/or the individual components and methods of assembling the chew resistant, adjustable animal collar (100) in which the collar (100) is preferably a dog collar. In particular and as further shown in FIGS. 3A-4C, the chew resistant, adjustable animal collar (100) includes: (a) a tubular, elongate fabric sheath (110) having two opposing ends (111, 112) that are fluidly connected to one another by an internal cavity (113) extending through (completely through) the tubular, elongate fabric sheath (110); (b) a chew, resistant semi-rigid but flexible elongate insert (120) affixed to and completely positioned internally within the tubular, elongate fabric sheath (100); (c) a first portion (131) of a fastening means (130) affixed to a first end of the two opposing ends of the tubular, elongate fabric sheath (110); and (d) a second portion (135) of the fastening means (130) affixed to a second end tubular, elongate fabric sheath (110) in which the first and second portions of the fastening means are configured to securely engage one another while the chew resistant, adjustable animal collar (100) is in use. The tubular, elongate fabric sheath is preferably soft, durable, and comfortable and is a woven, braided, or knitted fabric comprised of nylon, and the internal cavity of the tubular, elongate fabric sheath preferably includes an inner diameter ranging from 0.5 inches to 1 inch, and more preferably from 0.6 inches to 0.8 inches for receiving (securely receiving) the chew, resistant semi-rigid but flexible elongate insert (120) therein. As further shown in FIGS. 3E and 4A-4C, the chew resistant, adjustable animal collar (100) may further include a reflective material (114) affixed to an outer surface of the tubular, elongate fabric sheath (110) and spanning substantially an entire length along a longitudinal axis ($L^1$) of the tubular, elongate fabric sheath (110).

Figure 1B:
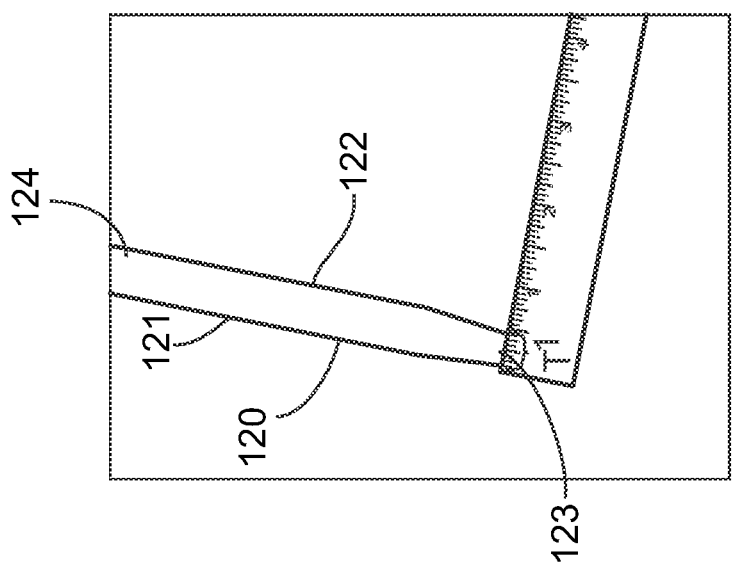
FIG. 1B shows depicts the chew, resistant semi-rigid but flexible elongate insert after trimming an end to achieve a tapered end.
Figure 1A:
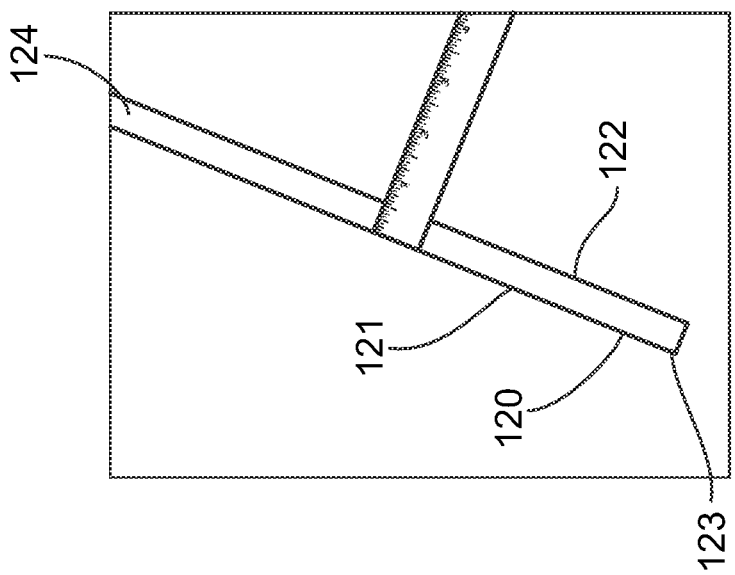
FIG. 1A depicts the initial chew, resistant semi-rigid but flexible elongate insert having a uniform width.
Figure 2:
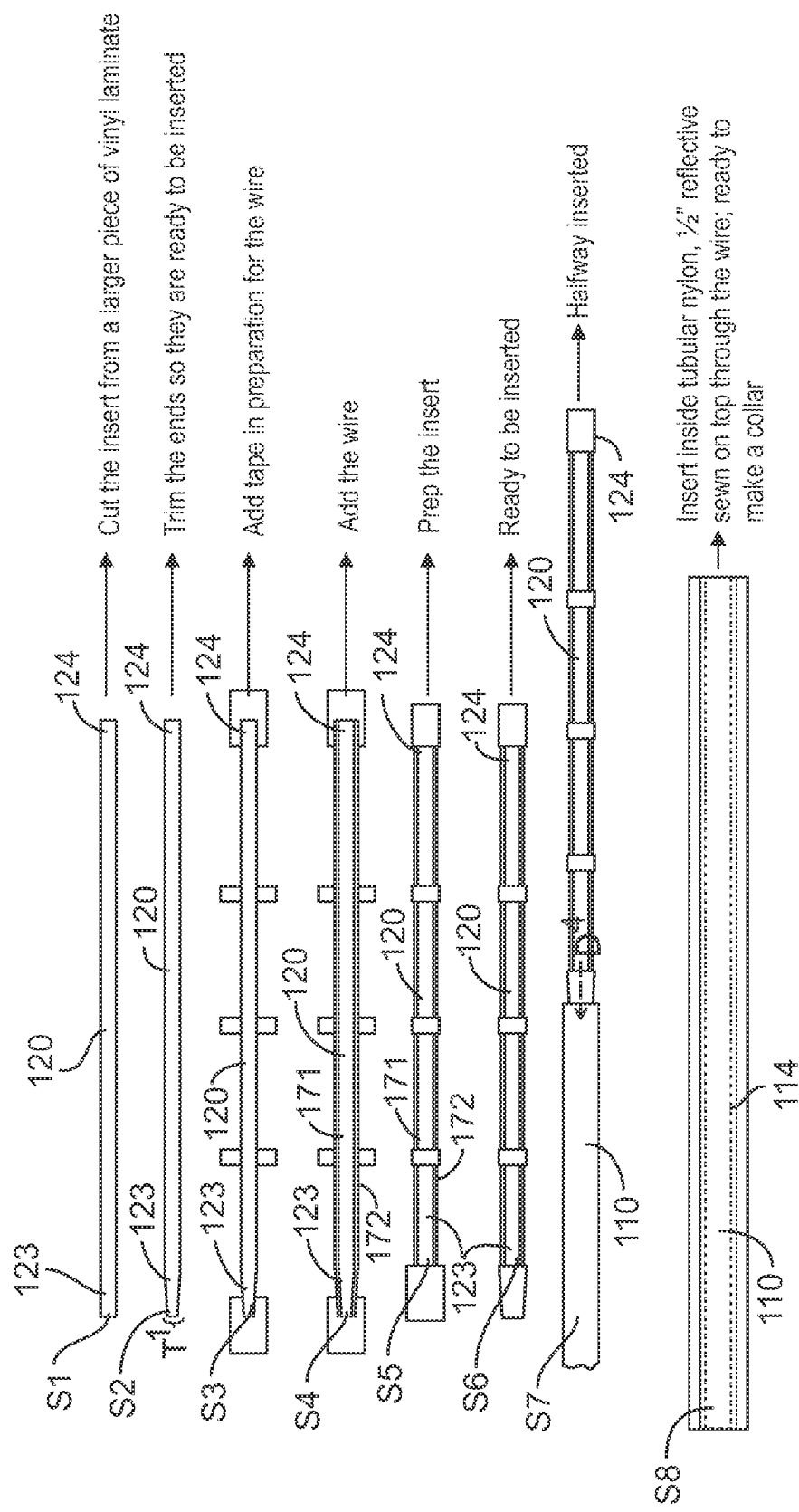
FIG. 2 shows sequential steps S1-S8 of preparing and inserting the chew, resistant semi-rigid but flexible elongate insert within the cavity of the tubular, elongate fabric sheath.
Figure 5:
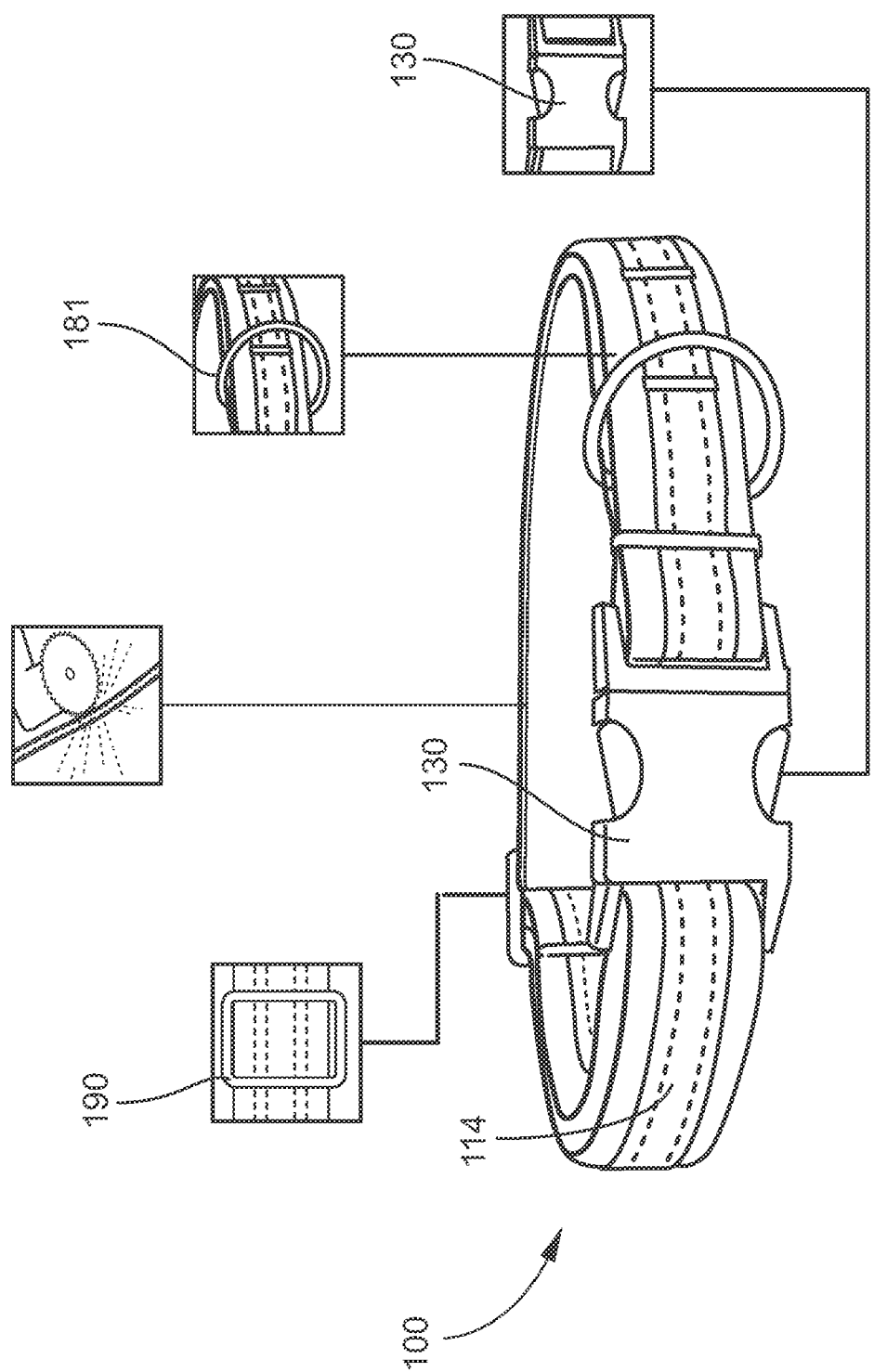
FIG. 5 depicts a perspective view of the collar as well as magnified portions thereof

As shown, for example in FIGS. 1A-1C and in FIG. 2 S1-S6, the chew, resistant semi-rigid but flexible elongate insert (120) has two opposing ends (121, 122) in which each opposing end is tapered ($T^1$) in width to facilitate insertion within the tubular, elongate fabric sheath (110). In certain aspects, the chew, resistant semi-rigid but flexible elongate insert (120) preferably comprises a vinyl laminate material that ranges from 0.07 inches to 0.1 inches in thickness ($T^2$) and more preferably from 0.075 inches to 0.085 inches in thickness. This thickness provides for sufficient rigidity to impart chew resistant characteristics mentioned herein while also allowing for sufficient flexibility to allow the collar to be properly fitted onto and worn by the animal (dog) while minimizing discomfort.

In view of FIG. 1C, FIG. 2 S4-S6, and FIGS. 3B-3D and to further increase chew-resistant characteristics of the collar, a first metal wire (171) is affixed to a first peripheral edge (121) of and spanning substantially an entire length of a longitudinal axis ($L^2$) of the vinyl laminate material (chew, resistant semi-rigid but flexible elongate insert (120)). As further shown in FIG. 1C, FIG. 2 S4-S6, and FIGS. 3B-3D, a second metal wire (172) affixed to a second peripheral edge (122) of the vinyl laminate material (chew, resistant semi-rigid but flexible elongate insert (120)) is also included on an opposing side of the vinyl laminate material relative to the first peripheral edge (171) of the vinyl laminate material, second metal wire spanning substantially the entire length of the longitudinal axis of the vinyl laminate material to further increase chew-resistant characteristics of the collar. In certain aspects, each metal wire comprises a galvanized vinyl coated steel wire and has a diameter ranging from 1/8 inch to 1/18 inch. In certain preferred aspects, the galvanized vinyl coated steel wire has a diameter of 1/16 inch. In certain aspects, the reflective material (114) reflects light up to 200 feet away, more preferably up to 400 feet away, and most preferably up to 600 feet away.

Regarding the fastening means (130) and in view of FIGS. 4A-4C, the fastening means preferably comprises a side release buckle. The side release buckle includes, for example, (i) a body (132) (or housing) as the first portion (131) of the fastening means (130); and (ii) resiliently deformable locking pins (136, 137) as the second portion (135) of the fastening means (130) that are securely received within the body (132) when the body and resiliently deformable locking pins are advanced towards one another ($D^2$) and the resiliently deformable locking pins (136, 137) are received within the body thereby securing and/or locking the fastening means. The resiliently deformable locking pins (136, 137) are further configured to be released from the body when the locking pins are biased towards one another ($D^1$) and the body and resiliently deformable locking pins are moved in opposite directions ($D^3$) away from one another. In certain aspects, the fastening means/side release buckle is preferably formed from a metal material (e.g., a high polished nickel plated metal with a mirror-like finish so that it is functional as well as being aesthetically pleasing). In certain aspects, the metal triglide (190) is configured to adjust overall length (i.e., shorten and/or lengthen) of the chew resistant, adjustable animal collar by a predetermined length/amount.

As further shown in FIGS. 4A-4C, the collar (100) further includes a loop (180) affixed along a length of the chew resistant, adjustable animal collar and positioned internal relative to the fastening means (130), the loop configured for leash attachment thereto, and in certain aspects, the loop is a D ring (181).

It should be further noted that FIGS. 1A-1C sequentially depict the preparation of the chew, resistant semi-rigid but flexible elongate insert (120) pre-insertion into the internal cavity (113) of the tubular, elongate fabric sheath (110). FIG. 2, steps S-1 through S-8 and FIGS. 3A-3D sequentially depict preparation of and assembly of the chew, resistant semi-rigid but flexible elongate insert (120) with the tubular, elongate fabric sheath (110). For example and with specific reference to FIG. 2, S1, the chew, resistant semi-rigid but flexible elongate insert (120) is initially provided having untrimmed (i.e., non-tapered) opposing ends (123, 124). As further shown in S2, the opposing ends (123, 124) are subsequently trimmed to obtain tapered ends, which facilitates and aids when inserting the insert into the internal cavity (113) of the sheath (110).

In certain aspects and as shown in S3, tape and/or another adhesive may be applied to portions of the elongate insert (120) so that metal wires (171, 172) may be affixed (permanently affixed) to peripheral edges (121, 122) in steps S4-S6. Step S6 in FIG. 2 in particular shows the insert (120) with opposing tapered ends (123, 124) having a first (171) and second (172) metal wire securely affixed on the first (121) and second (122) peripheral edges respectively. Next and as shown in FIG. 2, S7 and FIGS. 3B-3D, a tapered end (123) of insert (120) is advanced in a direction (D$^4$) towards and inserted within internal cavity (113) of sheath (110). As further shown in FIGS. 3C-3E and FIG. 2, S8, the insert (110) is continually advanced in direction (D$^4$) until the insert (110) is completely positioned within and concealed by elongate sheath (110). Next, the opposing ends (112, 113) of the sheath (110) are stitched/sewn together thereby preventing removal of insert therefrom. It should be further noted that insert (120) and sheath (110) are friction fitted to one another to sufficiently reduce and/or completely prevent movement of insert (120) post-insertion within sheath (110) and when the fully assembled collar (100) is in use. After, stitching/sewing opposing ends (112, 113) of the sheath (110) together, the fastening means (e.g., the side buckle release) as well as the loop (180) may be affixed thereon thereby completing the assembly of collar (100), which is now ready for use.

In certain aspects, the chew resistant, adjustable animal collar (100) may be included within packaging for retail purposes. In certain additional aspects, the chew resistant, adjustable animal collar (100) may be packaged within a kit that further includes an animal leash for use with the collar.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A chew resistant, adjustable animal collar comprising:
    (a) a tubular, elongate fabric sheath having two opposing ends that are fluidly connected to one another by an internal cavity extending through the tubular, elongate fabric sheath;
    (b) a chew resistant, semi-rigid but flexible elongate insert affixed to and completely positioned internally within the tubular, elongate fabric sheath;
    (c) a first portion of a fastening means affixed to a first end of the two opposing ends of the tubular, elongate fabric sheath;
    (d) a second portion of the fastening means affixed to a second end tubular, elongate fabric sheath in which the first and second portions of the fastening means are configured to securely engage one another while the chew resistant, adjustable animal collar is in use; and
    (e) a reflective material affixed to an outer surface of the tubular, elongate fabric sheath and spanning substantially an entire length along a longitudinal axis of the tubular, elongate fabric sheath, wherein:
    the chew resistant, semi-rigid but flexible elongate insert has two opposing ends in which each opposing end is tapered in width to facilitate insertion within the tubular, elongate fabric sheath;
    wherein the chew resistant, semi-rigid but flexible elongate insert comprises a vinyl laminate material having a first metal wire that is chew resistant and is affixed directly to a first peripheral edge of and spanning substantially an entire length of a longitudinal axis of the vinyl laminate material, and a second metal wire affixed directly to a second peripheral edge of the vinyl laminate material on an opposing side of the vinyl laminate material relative to the first peripheral edge of the vinyl laminate material that is chew resistant and spans substantially the entire length of the longitudinal axis of the vinyl laminate material, the first metal wire and second metal wire are completely concealed within the tubular, elongate fabric sheath.

2. The chew resistant, adjustable animal collar of claim 1, wherein the vinyl laminate material ranges from 0.07 inches to 0.1 inches in thickness.

3. The chew resistant, adjustable animal collar of claim 2, wherein each metal wire comprises a galvanized vinyl coated steel wire.

4. The chew resistant, adjustable animal collar of claim 3, wherein the galvanized vinyl coated steel wire has a diameter ranging from ⅛ inch to 1/18 inch.

5. The chew resistant, adjustable animal collar of claim 3, wherein the galvanized vinyl coated steel wire has a diameter of 1/16 inch.

6. The chew resistant, adjustable animal collar of claim 4, wherein the fastening means comprises a side release buckle.

7. The chew resistant, adjustable animal collar of claim 6, wherein the side release buckle comprises:
    (i) a body as the first portion of the fastening means; and
    (ii) resiliently deformable locking pins as the second portion of the fastening means that are securely received within the body when the body and resiliently deformable locking pins are advanced towards one another and the resiliently deformable locking pins are received within the body, the resiliently deformable locking pins configured to be released from the body when the locking pins are biased towards one another and the body and resiliently deformable locking pins are moved in opposite directions away from one another.

8. The chew resistant, adjustable animal collar of claim 7, further comprising a loop affixed along a length of the chew resistant, adjustable animal collar and internal relative to the fastening means, the loop configured for leash attachment thereto.

9. The chew resistant, adjustable animal collar of claim 8, wherein the loop is a D ring.

10. The chew resistant, adjustable animal collar of claim 9, further comprising a triglide configured to adjust overall length of the chew resistant, adjustable animal collar.

11. The chew resistant, adjustable animal collar of claim 10, wherein the chew resistant, adjustable animal collar is a dog collar.

* * * * *